UNITED STATES PATENT OFFICE.

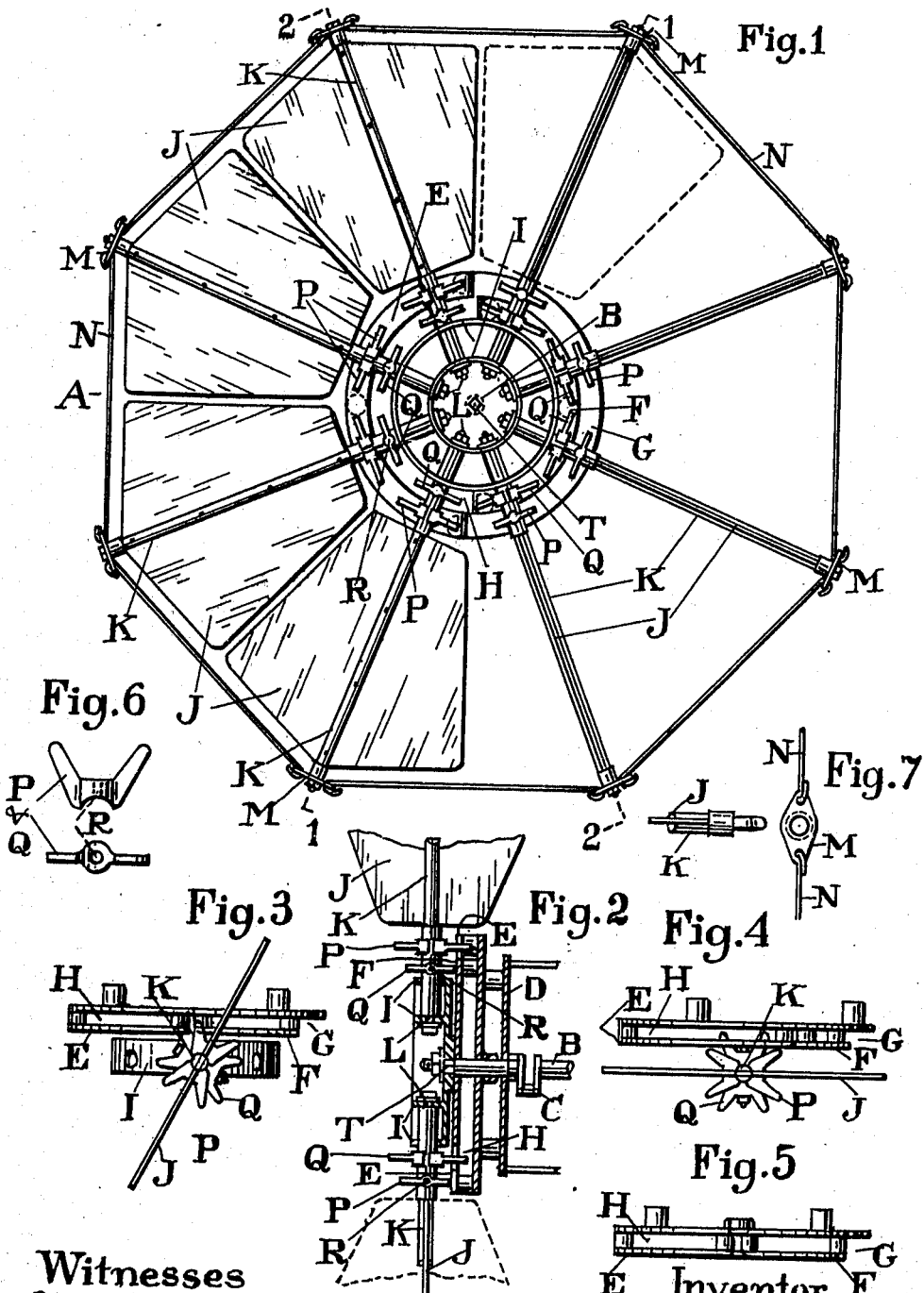

JAMES BENNETT, OF SAN FRANCISCO, CALIFORNIA.

PROPELLER-WHEEL.

974,344.  Specification of Letters Patent.  Patented Nov. 1, 1910.

Application filed January 5, 1909. Serial No. 470,867.

*To all whom it may concern:*

Be it known that I, JAMES BENNETT, a citizen of the United States, residing at San Francisco, in the county of San Francisco and State of California, have invented a new and useful Propeller-Wheel, of which the following is a specification.

My invention relates to the improvements in propeller wheels, for the navigation of air or water, and also for driving wind mills, fans or for other purposes, in which a revolving wheel, with independent revolving spindles, and vanes, operating directly against the air or water; and the object of my improvements are, first, to provide a continuously revolving wheel, second, the independent revolving of each spindle and vane, and third, the turning of spindles and vanes through one fourth of a revolution when at the lowest end of the track, thus returning the vanes edgewise or in the position of least possible resistance to the upper end of the track, where they again turn through one fourth of a revolution, thus presenting the flat sides of the vanes, in which position they offer the maximum resistance. I attain these objects by the mechanism illustrated in the accompanying drawings in which:—

Figure 1 is a side view of the entire propeller wheel: Fig. 2, is a vertical section, showing the spindles with vanes attached in a turning position; Fig. 3, is a plan showing the turning guides coming in contact with the end of track; Fig. 4, shows the turning guides lying flat against the track which holds the vane in position between the ends of the tracks; Fig. 5, shows the stationary face plate with track attached; Fig. 6, shows the turning guides with side and front views; Fig. 7, shows the pivot plate for the outer end of the spindle, also the ferrule with pivot, on the end of the spindle.

Similar letters refer to similar parts throughout the several views.

(A) represents the entire wheel; (B) the square hole through the center of the metal plate, which metal plate with the inner and outer flanges constitutes hub, I. Through the square hole B, the axle is inserted and securely attached by a nut or key. The tracks E, and F, are attached securely to disk G, as shown in Fig. 2. The tracks E, and F, are made in half circles as shown in Fig. 1, with ends rounded or beveled to enable the turning guides P, and Q, to pass them with ease. The tracks E, and F, have lugs on the back at either end and one in the center that lie against and are securely fastened to disk G. The lugs are sufficiently deep to raise the tracks E and F high enough to permit the guides P, and Q, to pass through into the channels (formed by raising the tracks) without touching the disk, G, as shown in Fig. 4. The tracks may be set on the face plate to turn the spindles at a perpendicular or at any angle desired. The spindles, K, are round from the inner edge of vane, J, to the inner flange, pass through holes in the outer flange of hub, I, and are stepped into the inner flange with nut L, to secure them in place, thus forming one of the pivots on which they turn. Said outer ends of spindles may be round, square or of any shape desired. The outer ends are provided with a ferrule having a pin attached as shown in Fig. 7. The pin on the ferrule passes through a hole in plate M, and is threaded and provided with a nut which forms the outer pivot for the revolving of the spindle. The turning guides P and Q, Fig. 6, are attached to spindles directly over the tracks by means of bolts R, passing through the spindles at right angles as shown in Figs. 1 and 2. The holes in the outer flange Fig. 3, for the spindles to pass through form bearings between the inner and outer pivots of the spindles. In the revolution of the wheel, the guides P and Q, come in contact with the ends of track which turns the spindle and vane one quarter around; the guides lying flat upon the track hold the vanes in that position until the end of the other track is encountered as shown in Figs. 1 and 2. The truss rods N, are attached to plates M, Figs. 1 and 7, forming a continuous truss around the entire wheel.

I am aware that prior to my invention propeller wheels with vanes and truss rods attached, have been made, I therefore do not claim such combination broadly; but

I claim,

A propeller wheel comprising a plate with flanges attached at right angles constituting a hub, outwardly extending spindles journaled in the flanges of the hub, swiveled plates, and truss rods connecting said spindles at their outer ends, vanes and turning guides attached to said spindles, a shaft on which the wheel is mounted, a disk provided with a bearing for said shaft, and segmental tracks secured to said disk and adapted to engage said turning guides, substantially as set forth.

JAMES BENNETT.

Witnesses:
J. C. MILLER,
H. M. ROGERS.